US012552065B2

(12) United States Patent
Izumikawa et al.

(10) Patent No.: US 12,552,065 B2
(45) Date of Patent: Feb. 17, 2026

(54) METHOD FOR MANUFACTURING BURRING PROCESSED MEMBER

(71) Applicant: FUTABA INDUSTRIAL CO., LTD., Aichi (JP)

(72) Inventors: Daisuke Izumikawa, Aichi (JP); Mikuto Wakayama, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 120 days.

(21) Appl. No.: 18/760,629

(22) Filed: Jul. 1, 2024

(65) Prior Publication Data

US 2025/0018593 A1 Jan. 16, 2025

(30) Foreign Application Priority Data

Jul. 11, 2023 (JP) ................................. 2023-113834

(51) Int. Cl.
*B26F 1/14* (2006.01)

(52) U.S. Cl.
CPC ..................................... *B26F 1/14* (2013.01)

(58) Field of Classification Search
CPC ......................................................... B26F 1/14
See application file for complete search history.

(56) References Cited

U.S. PATENT DOCUMENTS

2017/0320122 A1* 11/2017 Matsuno ................... B26F 1/14
2019/0321874 A1* 10/2019 Sasaki ................... B32B 15/013

FOREIGN PATENT DOCUMENTS

JP S5728632 A 2/1982
JP H10296346 A * 11/1998
JP 2014193478 A 10/2014
JP 2021094580 A 6/2021
KR 20140138632 A * 12/2014 ............ B21D 51/22
WO WO-2022181088 A1 * 9/2022 ............ B21D 28/16

OTHER PUBLICATIONS

Notice of Reasons for Refusal dated Nov. 12, 2024 for corresponding Japanese Application No. 2023-113834.

* cited by examiner

*Primary Examiner* — Omar Flores Sanchez

(74) *Attorney, Agent, or Firm* — David D. Brush; Westman, Champlin & Koehler, P.A.

(57) ABSTRACT

In a method for manufacturing a burring processed member, an inner-circumferential surface of a plate-like curved portion is pressed in a first direction, thereby forming a side wall and a seating face, the side wall protruding from a rim of a first hole, the seating face extending from a tip of the side wall. In the method, a circular second hole is formed on the seating face, and the burring processed portion protruding in the first direction from the rim of the first hole is formed. The seating face includes two crests, each situated on a periphery of each end of the curved portion in a circumferential direction, and is slanted such that a seating face height becomes smaller from each of the crests to a substantial center in the circumferential direction.

10 Claims, 10 Drawing Sheets

METHOD FOR MANUFACTURING BURRING PROCESSED MEMBER

CROSS-REFERENCE TO RELATED APPLICATIONS

The present application claims the benefit of Japanese Patent Application No. 2023-113834 filed on Jul. 11, 2023 with the Japan Patent Office, the entire disclosure of which is incorporated herein by reference.

BACKGROUND

The present disclosure relates to a method for manufacturing a burring processed member.

There is known a technique for performing a burring process on a metal plate material to form a wall portion that surrounds a hole of the plate material and protrudes from a rim of the hole (hereinafter to be referred to as a burring processed portion). For example, Japanese Unexamined Patent Application Publication No. 2021-94580 discloses a technique as follows for performing the burring process. Firstly, a metal flat sheet is pressed with a die to form a raised face, and thus a hollow cylindrical portion is formed in a bottomed cylindrical shape. Secondly, a pilot hole is formed having a circular shape and penetrating a center of a bottom surface of the hollow cylindrical portion (hereinafter to be referred to as a seating face).

However, in a case where the burring processed portion is formed, through the burring process, on a pipe having a cylindrical shape so as to protrude in a radial direction of the pipe from an outer-circumferential surface of the pipe, a length of the burring processed portion in the radial direction (hereinafter to be referred to as a height) sometimes varies. Specifically, in a case where a crest of the burring processed portion is formed along a plane parallel to an axial line of the pipe, as the outer-circumferential surface of the pipe is curved, the height of the burring processed portion increases from a center to ends of the pipe in a circumferential direction. When forming the burring processed portion with such a configuration, cracks may occur in areas of the burring processed portion on a peripheral of its ends in a direction of the axial line of the pipe (hereinafter to be referred to as end peripheral areas), and such cracks are more highly likely to occur as the height of the burring processed portion increases.

SUMMARY

It is conceived, in order to avoid this, to perform the burring process through procedures of forming the raised face on the outer-circumferential surface of the pipe during which the seating face with a circular shape extending in the radial direction from the outer-circumferential surface is formed, and of forming on the seating face the pilot hole in a shape of an ellipse having a major axis whose direction coincides with the direction of the axial line of the pipe. Owing to this, areas of the seating face, on which the pilot hole is formed, on a peripheral of its ends in a circumferential direction of the pipe have relatively large widths. This makes it possible to reduce occurrence of cracks in the end peripheral areas during the burring process.

However, on the other hand, curvature is high in a periphery of each end of a rim of the pilot hole in the major axis (hereinafter to be referred to as a small-R portion). For this reason, during the burring process, stress is concentrated around the small-R portion on the seating surface, and cracks may occur.

In one aspect of the present disclosure, it is desirable to favorably perform the burring process on a curved member.

In one aspect of the present disclosure, the method for manufacturing a burring processed member comprises: forming a side wall and a seating face by pressing an inner-circumferential surface of a curved portion in a first direction, the side wall protruding from a rim surrounding a first hole on the curved portion, the curved portion being a plate-like member whose cross section that is orthogonal to an axial line is curved, the seating face extending from a tip of the side wall; and forming a second hole and a burring processed portion, the second hole having a circular shape and penetrating through the seating face, the burring processed portion protruding in the first direction from the rim of the first hole and having a wall-like structure surrounding the first hole. A direction that the cross section of the curved portion extends along is defined as a circumferential direction. A peripheral area of an outer rim of the seating face is defined as an outermost rim. The seating face comprises two crests that are situated at each end thereof in the circumferential direction. The seating face is slanted such that a seating face height becomes smaller from each of the crests to a substantial center in the circumferential direction, the seating face height being a length in the first direction between the seating face and a reference plane, the reference plane being a virtual plane that lies orthogonal to the first direction and lies closer to the inner-circumferential surface than the seating face.

According to the aforementioned configuration, owing to the two crests provided on the seating face, it is possible to reduce occurrence of cracks in the areas of the burring processed portion on a peripheral of its ends in the circumferential direction during forming of the burring processed portion. Accordingly, the second hole can be formed in a shape resembling a circle. This keeps an outer rim of the second hole from having high curvature at some points, and occurrence of cracks during the burring process can further be reduced. Thus, it is possible to favorably perform the burring process on the curved member.

In one aspect of the present disclosure, the seating face may be pressed in a second direction, which is opposite to the first direction, thereby forming the second hole.

According to the aforementioned configuration, it is possible to reduce occurrence of cracks during forming of the burring processed portion.

In one aspect of the present disclosure, an inner die and an outer die may be used in the method for manufacturing the burring processed member. The inner die may comprise a hole and an outer rim pressing surface. The hole is configured to allow the outer die to enter thereinto. The outer rim pressing surface surrounds the hole. An inner-circumferential surface of the curved portion may be pressed in the first direction with the outer rim pressing surface of the inner die, thereby forming the seating face and the two crests thereon. While an area of the inner-circumferential surface of the curved portion opposing to the seating face is supported by the outer rim pressing surface of the inner die, the seating face may be pressed with the outer die so as to displace the outer die toward the hole of the inner die, thereby forming the second hole.

According to the aforementioned configuration, it is possible to favorably perform the burring process on the curved member.

In one aspect of the present disclosure, in the method for manufacturing the burring processed member, the inner die and the outer die may be used. The inner die may comprise a hole and an outer rim pressing surface. The hole is configured to allow the outer die to enter thereinto. The outer rim pressing surface surrounds the hole. The inner-circumferential surface of the curved portion may be pressed in the first direction with the outer rim pressing surface of the inner die, thereby forming the seating face. While an area of the inner-circumferential surface of the curved portion opposing to the seating face is supported by the outer rim pressing surface of the inner die, the seating face may be pressed with the outer die and thereby forming the two crests on the seating face, and the outer die is further displaced toward the hole of the inner die and thereby forming the second hole.

According to the aforementioned configuration, it is possible to favorably perform the burring process on the curved member.

In one aspect of the present disclosure, the inner die may be used in the method for manufacturing the burring processed member. The inner die may be displaced in the first direction so as to press the inner-circumferential surface of the curved portion, thereby forming the seating face and the two crests thereon.

According to the aforementioned configuration, it is possible to favorably form the seating face and the two crests.

In one aspect of the present disclosure, when the inner die presses the inner-circumferential surface of the curved portion, an area of the outer-circumferential surface of the curved portion opposing to the inner die may be opened.

According to the aforementioned configuration, it is possible to favorably form the seating face and the two crests.

In one aspect of the present disclosure, in the method for manufacturing the burring processed member, the outer die may further be used. When the inner die presses the inner-circumferential surface of the curved portion, an area of the outer-circumferential surface of the curved portion opposing to the inner die may abut against the outer die.

According to the aforementioned configuration, it is possible to favorably form the seating face and the two crests.

In one aspect of the present disclosure, in the method for manufacturing the burring processed member, the inner die and the outer die may be used. The inner die may be displaced in the first direction so as to press the inner-circumferential surface of the curved portion, thereby forming the seating face. The seating face may be pressed by displacing the outer die in the second direction so as to form the two crests. The second direction may be opposite to the first direction.

According to the aforementioned configuration, it is possible to favorably form the seating face and the two crests.

In one aspect of the present disclosure, the burring processed member may be configured to be installed in a vehicle.

According to the aforementioned configuration, it is possible to favorably perform the burring process on a curved member installed in the vehicle.

In one aspect of the present disclosure, the burring processed member may be a part of a muffler.

According to the aforementioned configuration, it is possible to favorably perform the burring process on a curved member within the muffler.

BRIEF DESCRIPTION OF THE DRAWINGS

Example embodiments of the present disclosure will be described hereinafter with reference to the accompanying drawings, in which.

DETAILED DESCRIPTION OF THE PREFERRED EMBODIMENTS

Embodiments of the present disclosure are not limited to below-described embodiments, but may be in various forms within the technical scope of the present disclosure.

1. First Embodiment

[(1) Overview]

Figure 1:
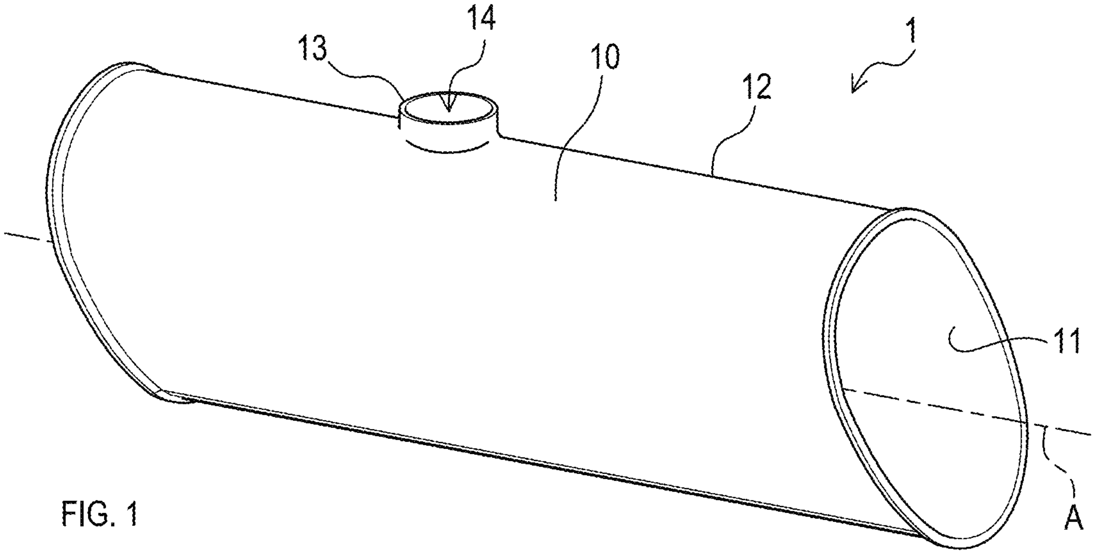
FIG. 1 is a perspective view of a shell in a first embodiment.

A first embodiment provides a method for manufacturing a shell 1 of a muffler installed in a vehicle (see, FIG. 1). The shell 1 is a tubular member formed by bending/curving a plate-like material, extends along an axial line A, and has a cross section with an elliptical shape (hereinafter to be simply referred to as a cross section), which is perpendicular to the axial line A. End plates are joined to both ends of the shell 1. There is a muffling space inside the shell 1.

The shell 1 is configured as a burring processed member, and comprises: a burring hole 14 penetrating through the shell 1; and a burring processed portion 13, which protrudes from a rim around the burring hole 14 in an outer-circumferential surface 12 of the shell 1 to an outer side and has a wall-like structure surrounding the burring hole 14. More specifically, the burring processed portion 13 is situated in a curved portion 10 that is a part of the shell 1 whose cross section is curved. For example, the burring processed portion 13 is situated in a vicinity of an end of the outer-circumferential surface 12 of the shell 1 along a major-axis direction in the elliptical cross section of the shell 1.

In the first embodiment, the method for manufacturing the shell 1 comprises procedures including: forming a raised face; piercing a hole; and burring, and through which the burring processed portion 13 is formed on the curved portion 10 of the shell 1. A plate thickness of the curved portion 10 is determined appropriately. The smaller the plate thickness is, the more easily the curved portion 10 is deformed during forming of the raised face. The curved portion 10 may have a structure in which plate materials are stacked on one another (for example, a double-wrapped structure).

This manufacturing method can be applied in manufacture of burring processed members for various purposes, the burring processed members having burring processed portions in the curved portions, formed of plate-like materials, whose cross sections are curved. Specifically, the burring processed member may be, for example, an exhaust pipe of a vehicle, an automotive component other than the exhaust pipe, or a component not installed in a vehicle.

[(2) Dies]

For forming of the raised face, piercing the hole, and burring, for example, an inner die 3, an outer die 4, an inner side die 5, and an outer side die 6 are used (see, FIGS. 2 to 7, 9).

The inner side die 5 is configured to abut against an area of inner-circumferential surface 11 of the shell 1 other than the area at which the burring processed portion 13 is to be formed (see, FIGS. 2, 3, 7, and 9). The inner side die 5 is provided with a layout space 50 with a cylindrical shape for placing the inner die 3.

The outer side die 6 is configured to abut against an area of the outer-circumferential surface 12 of the shell 1 other than the area at which the burring processed portion 13 is to be formed (see, FIGS. 2, 3, 7, and 9). The outer side die 6 is provided with a layout space 60 with a cylindrical shape for disposing the inner die 3 and the outer die 4.

The inner die 3 has a cylindrical shape, and is configured to press the inner-circumferential surface 11 of the curved portion 10 of the shell 1 at an end of the inner die 3 (see, FIGS. 2 to 7, and 9). The inner die 3 comprises an outer rim pressing surface 30 and a hole 33.

The outer rim pressing surface 30 has a band-like shape situating on a periphery of an outer rim of an end of the inner die 3, the end being for pressing the curved portion 10, and extends along the outer rim of the end of the inner die 3 such that it surrounds the hole 33.

The hole 33 is formed at the end of the inner die 3 and communicates with an internal space of the cylindrical inner die 3. The outer die 4 can enter inside the hole 33.

The outer die 4 has a cylindrical shape and has a pressing surface 40 at an end thereof, with which the outer-circumferential surface 12 of the curved portion 10 of the shell 1 is pressed (see, FIGS. 2, 3, 7 and 9). The pressing surface 40 is an approximately plane substantially lying orthogonal to a longitudinal direction of the outer die 4.

[(3) Forming a Raised Face]

Figure 2:
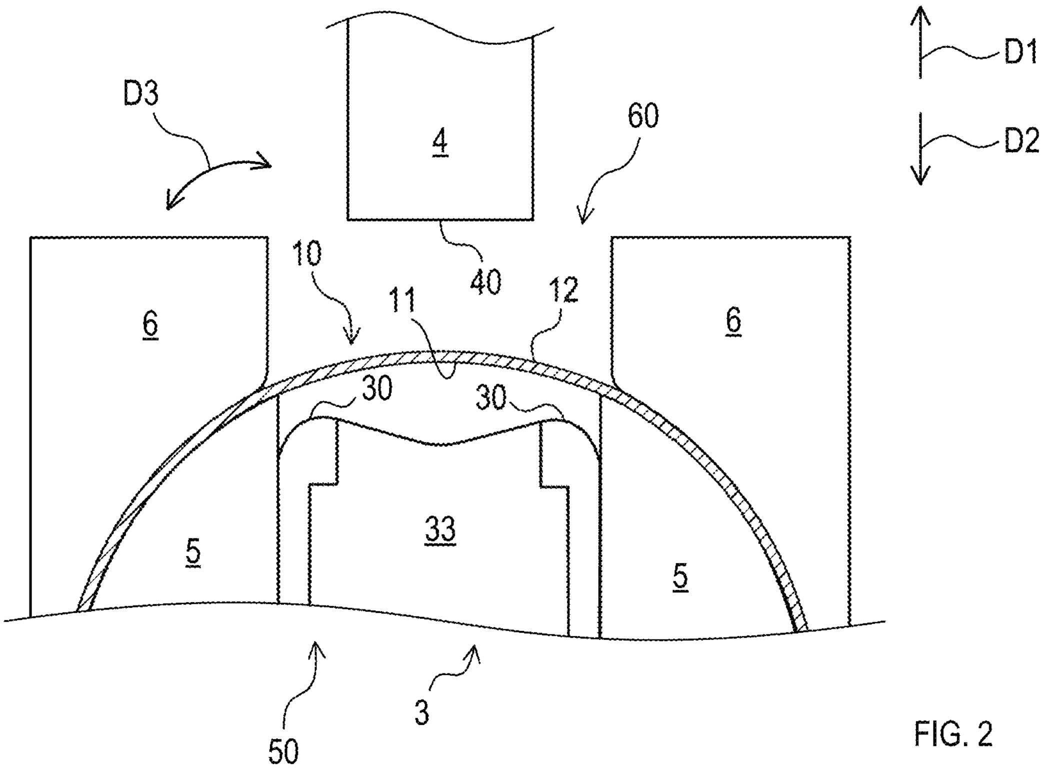
FIG. 2 is an explanatory diagram of a curved portion, an inner die, an outer die, an inner side die, and an outer side die in the first embodiment before forming a raised face, viewed in a direction of an axial line.
Figure 3:
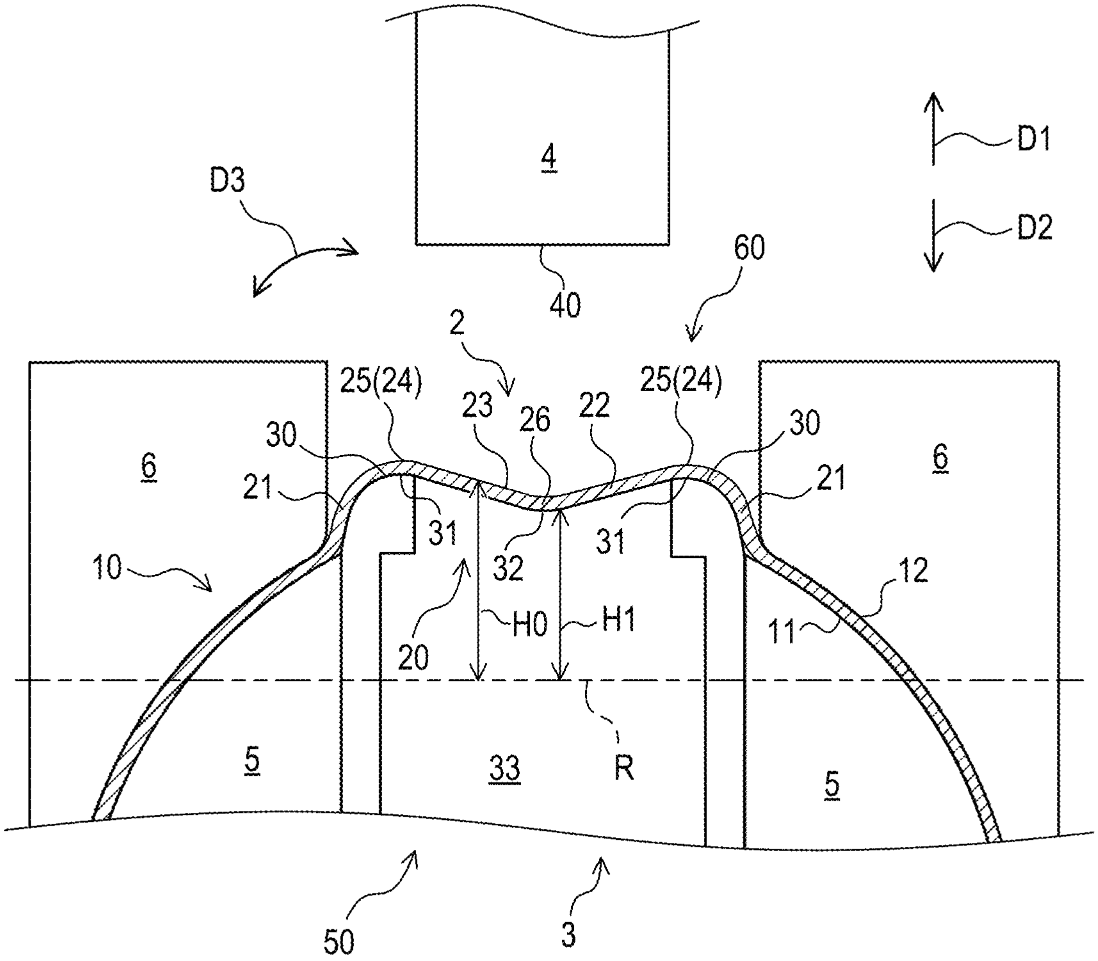
FIG. 3 is an explanatory diagram of the curved portion, the inner die, the outer die, the inner side die, and the outer side die in the first embodiment when forming the raised face, viewed in the direction of the axial line.
Figure 4:
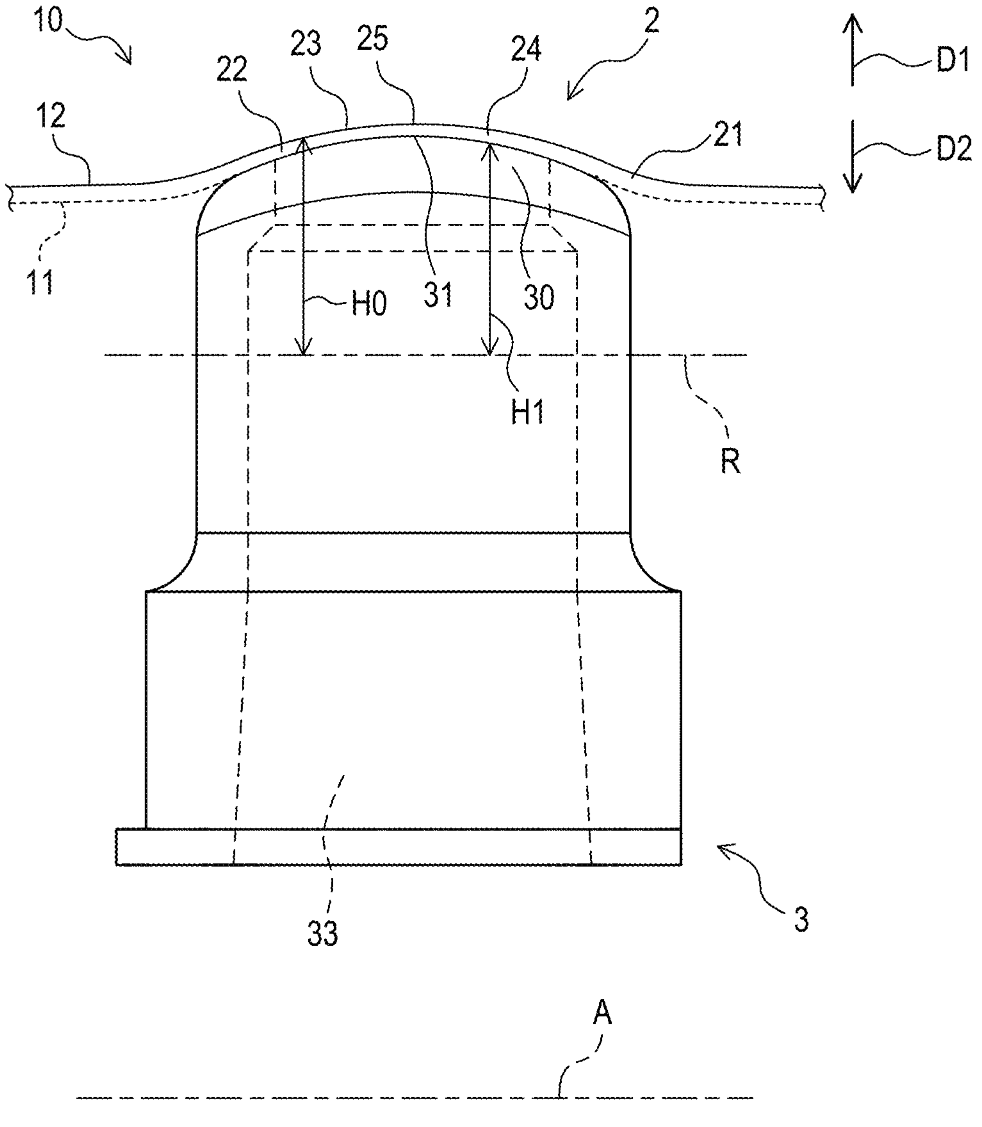
FIG. 4 is an explanatory diagram of the curved portion and the inner die in the first embodiment when forming the raised face, viewed in a circumferential direction.
Figure 5:
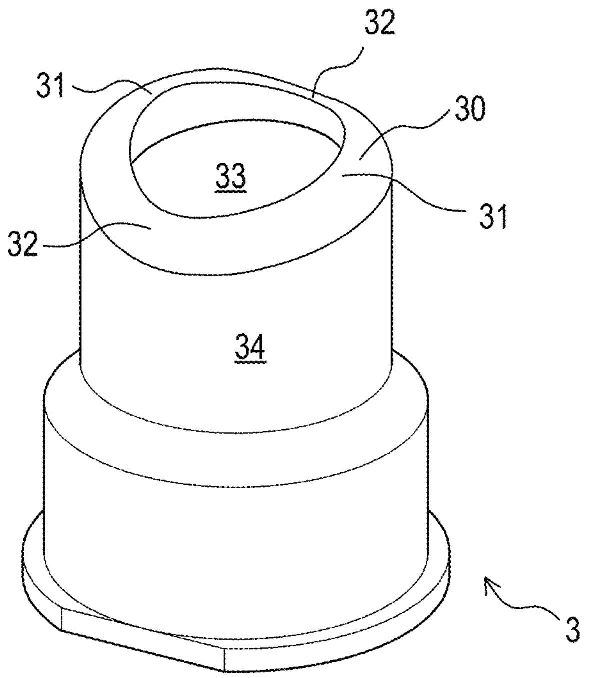
FIG. 5 is a perspective view of the inner die in the first embodiment.
Figure 6:
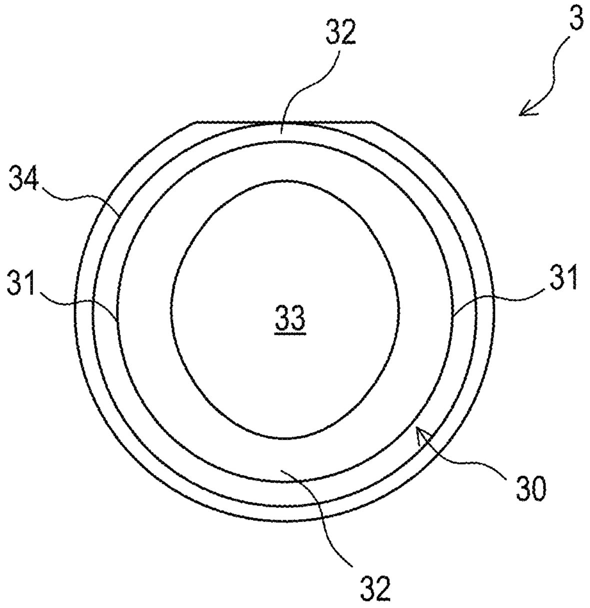
FIG. 6 is a front view of the inner die in the first embodiment.
Figure 7:
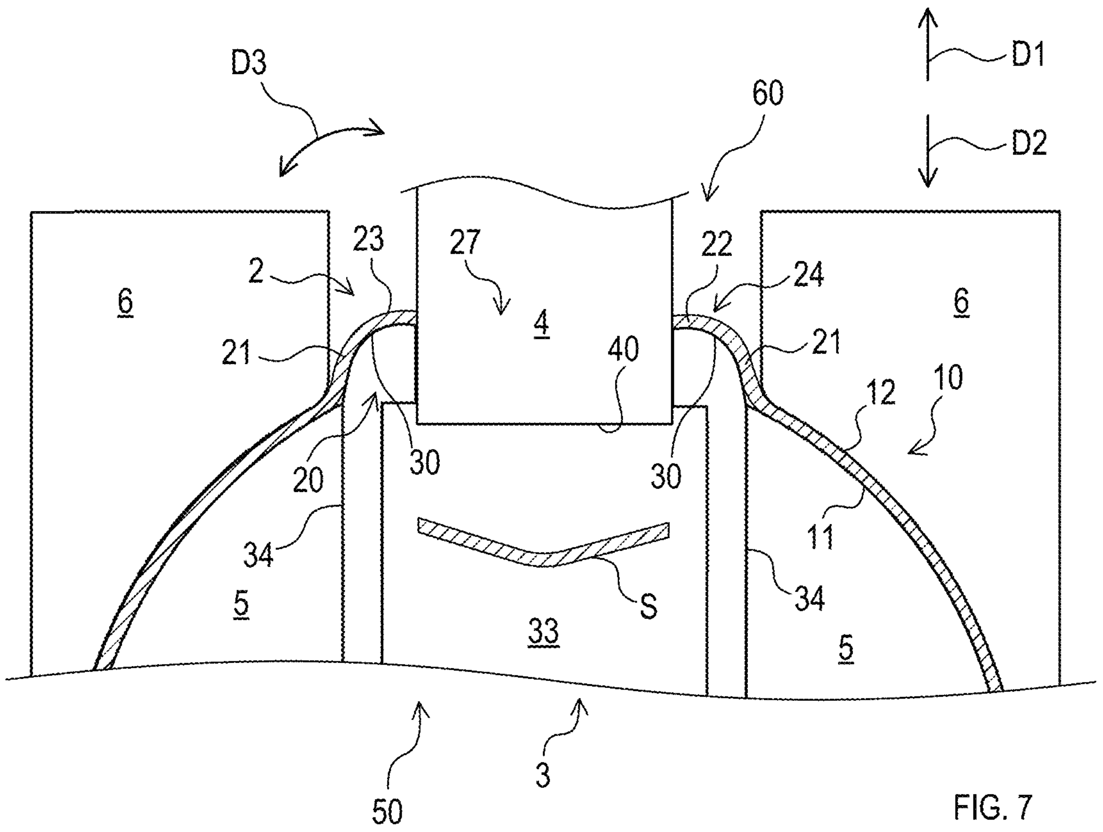
FIG. 7 is an explanatory diagram of the curved portion, the inner die, the outer die, and the inner side die, and the outer side die in the first embodiment when piercing a hole, viewed in the direction of the axial line.

In forming the raised face, the inner-circumferential surface 11 of the curved portion 10 of the shell 1 is pressed with the aforementioned die, thereby forming a raised face 2 with a bottomed cylindrical shape (see, FIGS. 2 to 4).

To form the raised face, the shell 1 is firstly fixed with the inner side die 5 and the outer side die 6. To be specific, the inner side die 5 is placed inside the shell 1 and abuts against a periphery of an area of the inner-circumferential surface 11 at which the burring processed portion 13 is to be formed. The outer side die 6 is placed outside the shell 1 and abuts against a periphery of an area of the outer-circumferential surface 12 at which the burring processed portion 13 is to be formed. Then the inner side die 5 and the outer side die 6 hold the shell 1, thereby fixing the shell 1 (see, FIG. 2).

At this point, for example, the inner side die 5 is placed on a lower side while the outer side die 6 is placed on an upper side. However, positions of the inner side die 5 and the outer side die 6 are not limited to this and may be appropriately determined.

The inner die 3 is placed in the layout space 50 of the inner side die 5. At this point, the inner die 3, in which a longitudinal direction thereof corresponds to a first direction D1, is displaceable in the first direction D1 and a second direction D2. The first direction D1 is a direction from inside to outside of the shell 1 and may, for example, substantially correspond to a radial direction of the cross section of the curved portion 10. The second direction D2 is opposite to the first direction D1. The first and second directions D1, D2 may be, for example, parallel to a vertical direction.

Then the inner die 3 is displaced in a first direction D1 so as to press the inner-circumferential surface 11 of the curved portion 10 of the shell 1 with the outer rim pressing surface 30. At this point, the outer rim pressing surface 30 of the inner die 3 faces the layout space 60 of the outer side die 6 having the curved portion 10 therebetween. In other words, an area of the outer-circumferential surface 12 of the curved portion 10 opposing to the outer rim pressing surface 30 is situated in the layout space 60 and opened. This is how forming of the raised face is performed, and the raised face 2 is formed on the curved portion 10 (see, FIGS. 3 and 4).

[(4) Raised Face]

The raised face 2 comprises a side wall 21 and a seat 22 (see, FIGS. 3 and 4).

The side wall 21 is a wall-like portion, which protrudes in the first direction D1 (in other words, outward) from a rim surrounding a first hole 20 having a circular shape provided in the curved portion 10, and has a tubular shape surrounding the first hole 20. In other words, the first hole 20 corresponds to an opening surrounded by a boundary between an end of the tubular side wall 21 and the curved portion 10. The circular shape mentioned herein means, for example, shapes including a circle, a substantially circle, an oval, or a substantially oval.

The seat 22 is a wall-like portion covering an outer end of the side wall 21. An outer surface of the seat 22 forms a seating face 23. The seating face 23 is a surface in a circular shape expanding from a tip of the side wall 21 and protrudes outward beyond areas of the outer-circumferential surface 12 of the shell 1 on a peripheral of the raised face 2. The seating face 23 comprises an outermost rim 24, and two crests 25, and a center portion 26.

In the first embodiment, a slant in the seating face 23, in other words, the two crests 25 and the center portion 26 are formed by being pressed with the outer rim pressing surface 30 of the inner die 3 during forming of the raised face. In other words, the seating face 23 is formed in a shape corresponding to a shape of the outer rim pressing surface 30. Hereinafter, a direction along which the cross section of the curved portion 10 extends is to be referred to as a circumferential direction D3. In other words, the circumferential direction D3 is a direction that approximately coincides with the direction along which an arc centered on the axial line A extends. A reference plane R is a virtual plane, which lies orthogonal to the first direction D1 and lies closer to the inner-circumferential surface 11 than to the seating face 23. A seating face height H0 is a length in the first direction D1 between the seating face 23 and the reference plane R.

The outermost rim 24 is situated in a band on a periphery of an outer rim of the seating face 23 and extends along the outer rim in a circle manner around a center of the seating face 23.

Each of the crests 25 is situated on a periphery of each end of the seating face 23 in the circumferential direction D3. For example, each of the crests 25 is formed on an area slightly apart from the outer rim of the seating face 23. However, the configuration of the crests 25 is not limited to this, and the crests 25 may be provided on the outer rim of the seating face 23. The seating face height H0 of each of the crests 25 is greater than that of any portion of the seating face 23 other than the two crests 25. The seating face height H0 of the two crests 25 may be the same or different.

The center portion 26 is situated substantially in the middle of the seating face 23 in the circumferential direction D3 and extends along the axial line A. The seating face height H0 of the center portion 26 may be, for example, substantially constant, and may be smaller than that of any other portion of the seating face 23.

The seating face 23 is slanted such that the seating face height H0 becomes smaller from each of the crests 25 to the center portion 26 when viewed from a side (see, FIG. 3). In other words, the seating face 23 has a V shape protruding in the second direction D2 when viewed in the direction of the axial line A. Also, when viewed from the side, the outermost rim 24 of the seating face 23 is slanted such that the seating face height H0 becomes smaller from each of the crests 25 to each end of the outermost rim 24 in the direction of the axial line A along the outer rim of the seating face 23 (see, FIG. 4). The seating face 23 is curved such that it protrudes in the first direction D1 when viewed in the circumferential direction D3

[(5) Inner Die]

The slant in the seating face 23 is formed by pressing the inner-circumferential surface 11 of the curved portion 10 with the outer rim pressing surface 30 of the inner die 3, and the outermost rim 24 of the seating face 23 has a shape similar to that of the outer rim pressing surface 30 (see, FIGS. 3 to 6). In other words, the outer rim pressing surface 30 of the inner die 3 comprises two crests 31 and a center portion 32. Each of the crests 31 and the center portion 32 are respectively portions for forming each of the crests 25 and the center portion 26 on the seating face 23. Hereinafter, the outer rim pressing surface 30 will be detailed based on its position during forming of the raised face.

Each of the crests 31 is situated on a periphery of each end of the outer rim pressing surface 30 in the circumferential direction D3. For example, each of the crests 31 is formed on an area slightly apart from an outer rim of the outer rim pressing surface 30. However, the configuration of the crests 31 is not limited to this, and the crests 31 may be provided on the outer rim of the outer rim pressing surface 30. Each of the crests 31 has a length in the first direction D1 from the reference plane R (hereinafter to be referred to as an inner die height H1) that is greater than that of any portion of the outer rim pressing surface 30 other than the two crests 31. The inner die height H1 of the two crests 31 may be the same or different.

The center portion 32 is situated substantially in the middle of the outer rim pressing surface 30 in the circumferential direction D3 and extends along the axial line A. The inner die height H1 of the center portion 32 may be, for example, substantially constant, and may be smaller than that of any other portion of the outer rim pressing surface 30.

The outer rim pressing surface 30 is, similarly to the seating face 23, slanted such that the inner die height H1 becomes smaller from each of the crests 31 to the center portion 32. In other words, the outer rim pressing surface 30 also has a V shape protruding in the second direction D2 when viewed in the direction of the axial line A. Also, the outer rim pressing surface 30 is, similarly to the outermost rim 24 of the seating face 23, slanted such that the inner die height H1 becomes smaller from each of the crests 31 to each end of the outer rim pressing surface 30 in the direction of the axial line A along the outer rim of the outer rim pressing surface 30. In other words, the outer rim pressing surface 30 is also curved such that it protrudes in the first direction D1 when viewed in the circumferential direction D3.

[(6) Piercing and Burring]

Piercing the hole is performed consecutively after forming the raised face. In piercing, a second hole 27 in a circular shape, which penetrates through the seating face 23 of the raised face 2, is firstly formed using the aforementioned dies (see, FIGS. 7 and 8). Then burring is performed, in which the raised face 2 on which the second hole 27 is formed is pressed with the aforementioned die and, thereby, the burring processed portion 13 is formed on a rim of the first hole 20 (in other words, the burring hole 14) (see, FIG. 9).

In piercing, similarly to in forming the raised face, the shell 1 is fixed with the inner side die 5 and the outer side die 6, and the outer rim pressing surface 30 of the inner die 3 abuts against the inner-circumferential surface 11 of the raised face 2. The outer die 4 is placed such that its longitudinal direction corresponds to the second direction D2. The outer die 4 is displaced in the second direction D2 so as to pass through the layout space 60 of the outer side die 6. At this point, the inner-circumferential surface 11 of the raised face 2 is supported by the outer rim pressing surface 30 of the inner die 3. Owing to this, the pressing surface 40 of the outer die 4 penetrates through the seat 22 after pressing the seating face 23 of the raised face 2 in the second direction D2, and then enters into the hole 33 of the inner die 3. As a result of this, the second hole 27 that penetrates through the seating face 23 (in other words, a pilot hole) is formed. At this point, a scrap S generated in a course of forming the second hole 27 falls into the hole 33 of the inner die 3. The second hole 27 may be formed in another manner, for example, by pressing the inner-circumferential surface 11 of the raised face 2 in the first direction D1 with a die.

Figure 8:
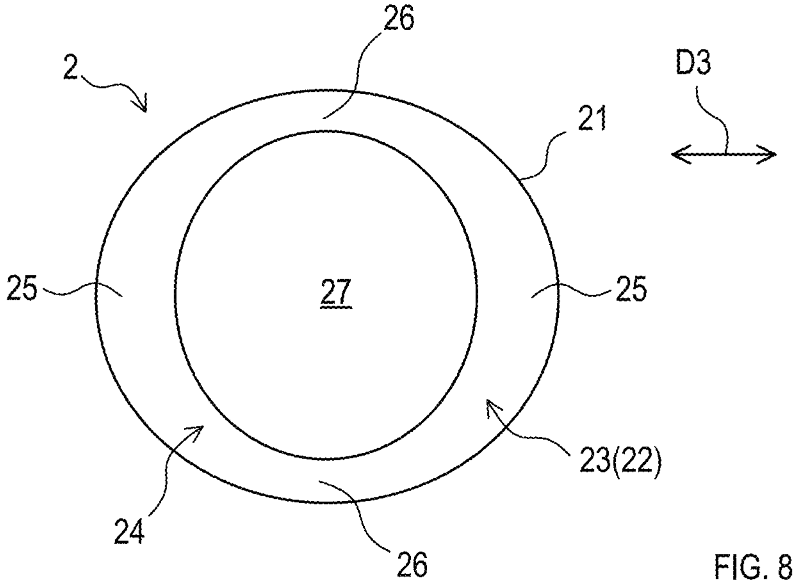
FIG. 8 is a front view of a seating face in the first embodiment, in which a second hole is formed.
Figure 9:
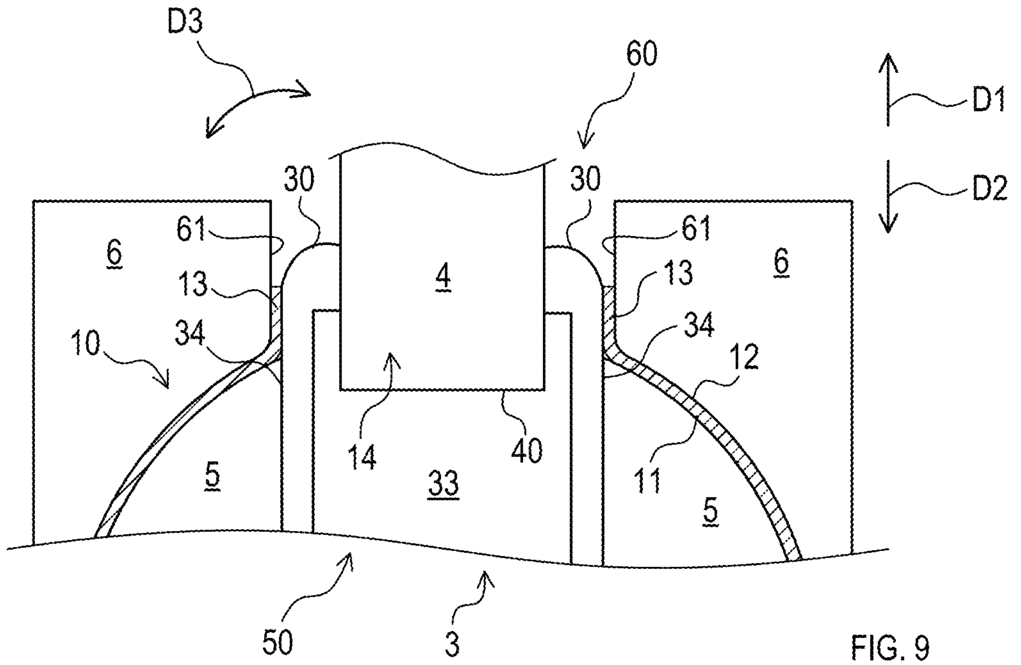
FIG. 9 is an explanatory diagram of the curved portion, the inner die, the outer die, the inner side die, and the outer side die in the first embodiment during burring, viewed in the direction of the axial line.

The second hole 27 has a center that substantially coincides with a center of the seating face 23 (see, FIG. 8). The second hole 27 is desirably formed in a shape as close to a perfect circle as possible.

When the second hole 27 is formed on the seating face 23 through piercing, displacement of the outer die 4 in the second direction D2 stops. At this point, the pressing surface 40 of the outer die 4 is situated inside the hole 33 of the inner die 3. Burring is performed after that, in which the inner side die 5 and the outer side die 6 are displaced in the second direction D2, and the shell 1 is accordingly displaced in the second direction D2. Owing to this, the outermost rim 24 that surrounds the second hole 27 in the seat 22 is caught between and pressed with an inner-circumferential surface 61, which surrounds the layout space 60 of the outer side die 6, and an outer-circumferential surface 34 of the inner die 3 (see, FIG. 9). As a result of this, the side wall 21 and the outermost rim 24 are extended along the first and second directions D1, D2 and, thereby, these portions are formed into the burring processed portion 13 surrounding the burring hole 14 (in other words, the first hole 20).

2. Second Embodiment

[(1) Overview]

A second embodiment provides a method for manufacturing the shell 1, in which the burring processed portion 13 is formed on the curved portion 10 of the shell 1, similarly to the first embodiment, through procedures of forming the raised face, piercing the hole and burring. However, the method in the second embodiment differs from that in the first embodiment in terms of the configuration of the outer die 4 and a timing when the slant is formed on the seating face 23. Next, a description will be given of differences of the method in the second embodiment from that in the first embodiment.

[(2) Forming Raised Face]

Figure 10:
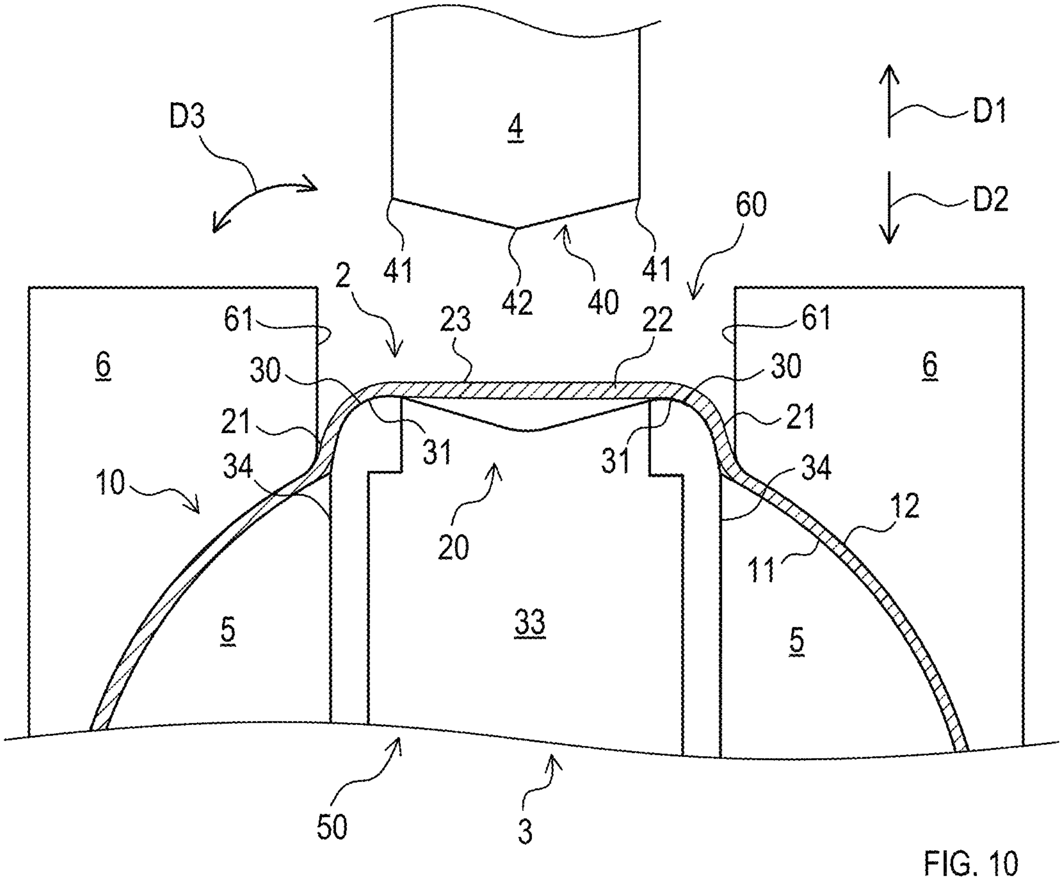
FIG. 10 is an explanatory diagram of a curved portion, an inner die, an outer die, an inner side die, and an outer side die in a second embodiment when forming the raised face, viewed in the direction of the axial line.

In the second embodiment, in forming the raised face, the curved portion 10 of the shell 1 is pressed with the aforementioned die, thereby forming the raised face 2 in a bottomed cylindrical shape (see, FIG. 10). If the plate thickness of the curved portion 10 is thick at this point, the slant might not be formed on the seating face 23. In the second embodiment, an example will be described in which, for example, the slant is not formed on the seating face 23.

Specifically, in forming the raised face, similarly to the first embodiment, the shell 1 is firstly fixed with the inner side die 5 and the outer side die 6, and the inner die 3 is placed in the layout space 50 of the inner side die 5. Then the inner die 3 is displaced in the first direction D1 so as to press the inner-circumferential surface 11 of the curved portion 10 of the shell 1 with the outer rim pressing surface 30. This is how forming the raised face is performed, and the raised face 2 is formed on the curved portion 10.

In the second embodiment, the seating face 23 of the raised face 2 formed through a process of forming the raised face is an approximately plane that substantially lies orthogonal to the first direction D1. Specifically, the inner die 3 used in the second embodiment has a similar configuration to that in the first embodiment, and a slant is formed on the outer rim pressing surface 30. However, if the plate thickness of the curved portion 10 is greater than that in the first embodiment, the seating face 23 might not be deformed in a shape corresponding to the shape of the outer rim pressing surface 30. In the second embodiment, examples of such a state are described, and in one example, the seating face 23 is substantially flat. The outer rim pressing surface 30 of the inner die 3 in the second embodiment may have a configuration in which the slant is not provided and may have a surface that is substantially flat and orthogonal to the first direction D1.

[(3) Piercing and Burring]

Figure 11:
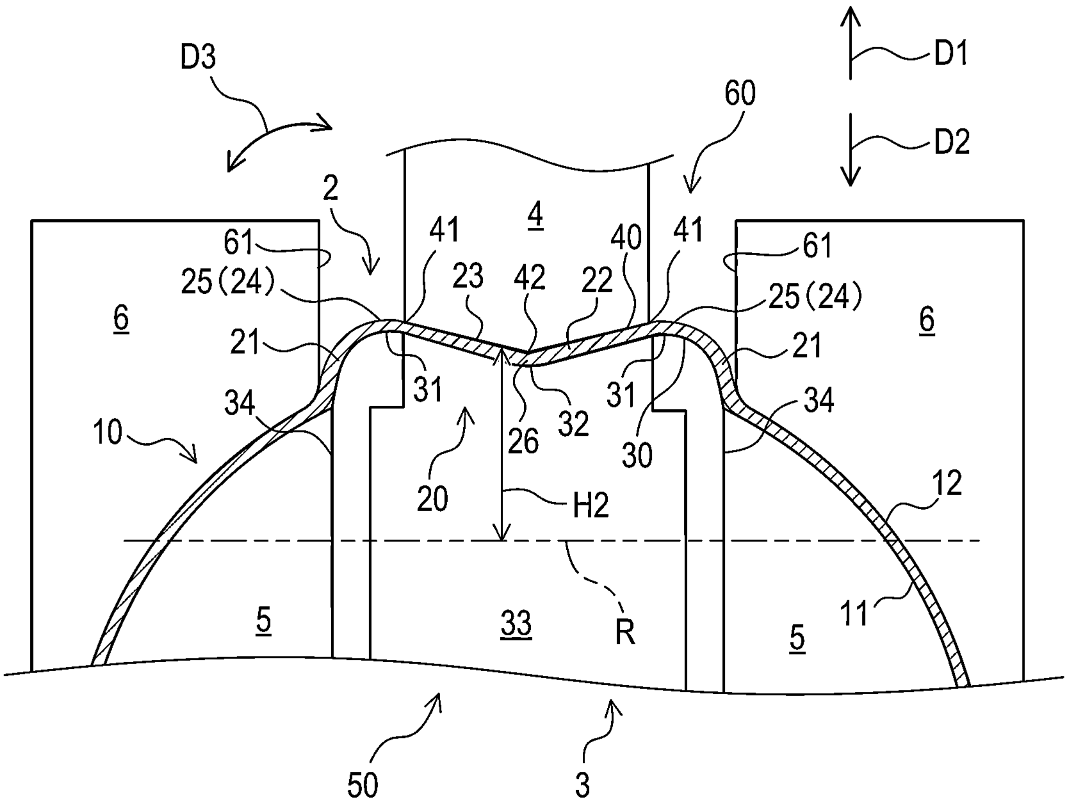
FIG. 11 is an explanatory diagram of the curved portion, the inner die, the outer die, the inner side die, and the outer side die in the second embodiment when piercing a hole, viewed in the direction of the axial line.
Figure 12:
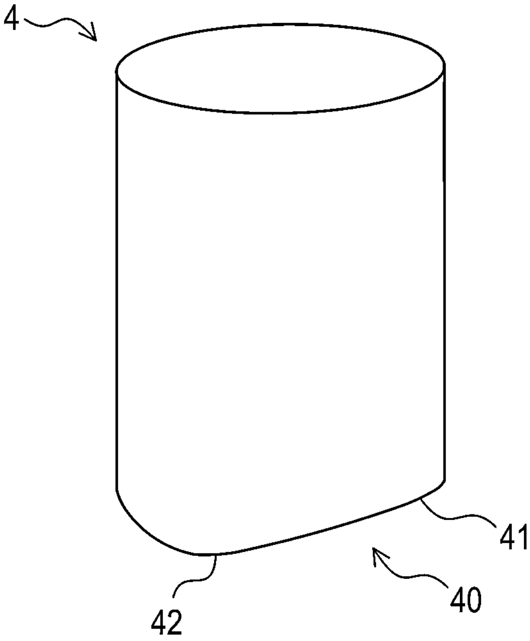
FIG. 12 is a perspective view of the outer die in the second embodiment.
Figure 13:
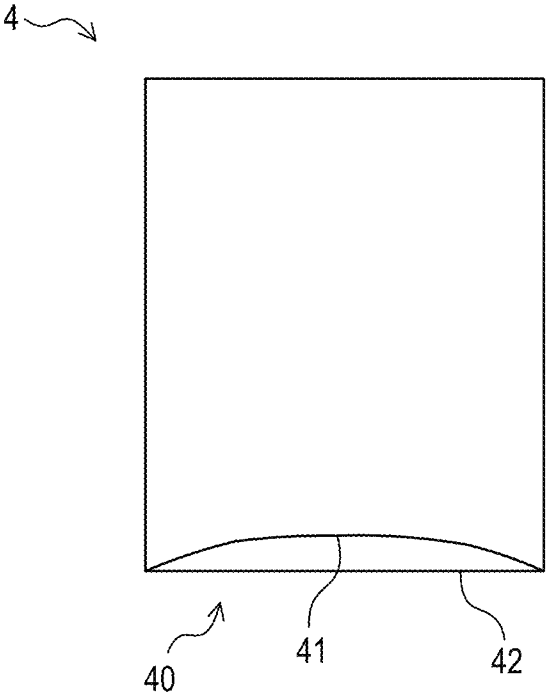
FIG. 13 is a side view of the outer die in the second embodiment.
Figure 14:
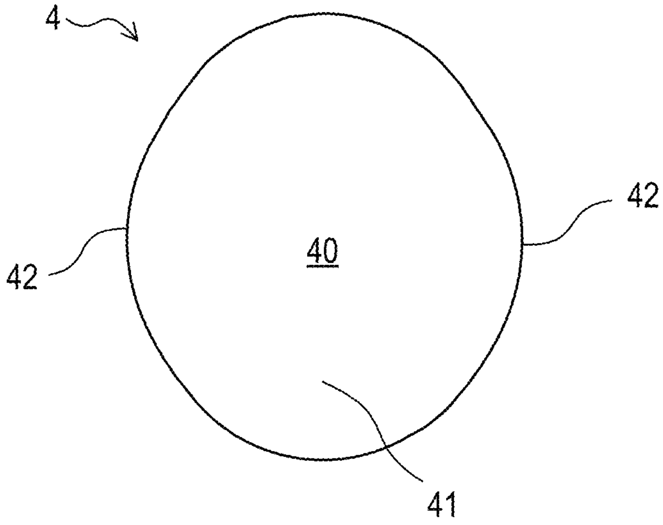
FIG. 14 is a front view of the outer die in the second embodiment.
Figure 15:
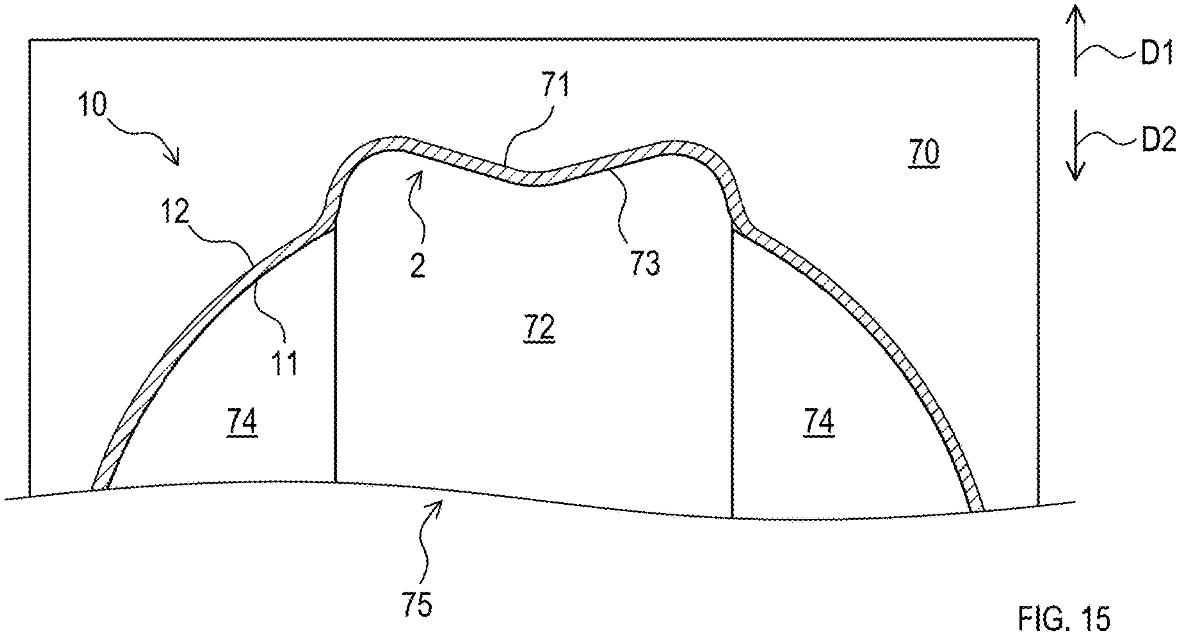
FIG. 15 is an explanatory diagram of a curved portion, a dedicated die, a press punch, and a pad in a third embodiment when forming the raised face, viewed in the direction of the axial line.
Figure 16:
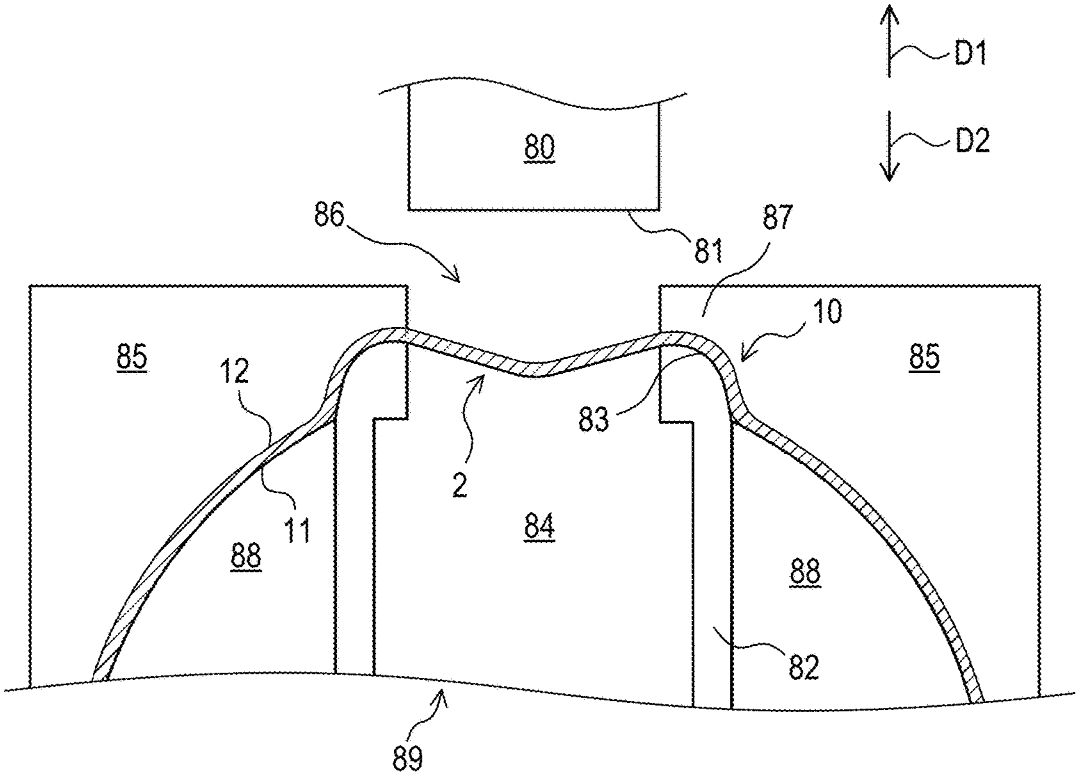
FIG. 16 is an explanatory diagram of the curved portion, a piercing punch, a piercing die, the pad, and the dedicated die in the third embodiment when piercing a hole, viewed in the direction of the axial line.

In the piercing performed consecutively after the forming the raised face, the slant similar to that in the first embodiment is formed on the seating face 23 of the raised face 2, and then the second hole 27 in a circular shape that penetrates through the seating face 23 is formed (see, FIG. 11). After that, through burring performed in a similar manner to in the first embodiment, the raised face 2 on which the second hole 27 is formed is pressed, the burring processed portion 13 is formed on the rim of the first hole 20.

In piercing, similarly to in forming the raised face, the shell 1 is fixed with the inner side die 5 and the outer side die 6, and the outer rim pressing surface 30 of the inner die 3 abuts against the inner-circumferential surface 11 of the raised face 2. The outer die 4 is placed such that its longitudinal direction corresponds to the second direction D2. The outer die 4 is displaced in the second direction D2 so as to pass through the layout space 60 of the outer side die 6 and then to reach at the hole 33 of the inner die 3. At this point, the inner-circumferential surface 11 of the raised face 2 is supported by the outer rim pressing surface 30 of the inner die 3.

In the second embodiment, the pressing surface 40 of the outer die 4 is provided with a later-described slant. Owing to this, the pressing surface 40 of the outer die 4, which displaces in the second direction D2, abuts against the seating face 23 of the raised face 2 and presses the seating face 23 and, thereby, the seat 22 caught between the pressing surface 40 and the outer rim pressing surface 30 is deformed, and the slant is formed on the seating face 23 in a similar manner to the slant in the first embodiment. In other words, the seating face 23 is formed in a shape corresponding to the pressing surface 40 and the outer rim pressing surface 30, and the two crests 25 and the center portion 26 that are similar to those in the first embodiment are formed on the seating face 23.

Then the pressing surface 40 of the outer die 4 penetrates through the seat 22, and the outer die 4 enter into the hole 33 of the inner die 3. This is how the second hole 27, which penetrates through the seating face 23, is formed. The scrap S generated in the course of forming the second hole 27 falls into the hole 33 of the inner die 3. The second hole 27 in the second embodiment has a shape similar to that in the first embodiment.

After that, upon completion of piercing the hole, displacement of the outer die 4 in the second direction D2 is stopped, and burring is performed in the similar manner to the first embodiment. Specifically, the inner side die 5 and the outer side die 6 are displaced in the second direction D2, thereby forming the burring processed portion 13.

[(4) Outer Die]

The pressing surface 40 of the outer die 4 has a shape similar to the seating face 23 on which the slant is formed (see, FIGS. 10 to 14). In other words, the pressing surface 40 comprises two crest forming portions 41 and a center portion 42. Each of the crest forming portions 41 and the center portion 42 are configured so as to form each of the crests 25 and the center portion 26 on the seating face 23, respectively. Next, the pressing surface 40 will be detailed based on its position during piercing.

Each of the crest forming portions 41 is situated at each end of the pressing surface 40 in the circumferential direction D3. In other words, each of the crest forming portions 41 is situated at an outer rim of the pressing surface 40. Each of the crest forming portions 41 has a length in the first direction D1 from the reference plane R (hereinafter to be referred to as an outer die height H2) that is greater than that of any portion of the pressing surface 40 other than the two crest forming portions 41. The outer die height H2 of the two crest forming portions 41 may be the same or different.

The center portion 42 is situated substantially in the middle of the pressing surface 40 in the circumferential direction D3 and extends along the axial line A. The outer die height H2 of the center portion 42 may be, for example, substantially constant.

The pressing surface 40 is slanted such that the outer die height H2 becomes smaller from each of the crest forming portions 41 to the center portion 42. In other words, the pressing surface 40 has a V shape in which the center portion 42 protrudes in the second direction D2 when viewed in the direction of the axial line A.

3. Third Embodiment

[(1) Overview]

A third embodiment provides a method for manufacturing the shell 1, in which, similar to the first embodiment, the burring processed portion 13 is formed on the curved portion 10 of the shell 1 through procedures of forming the raised face, piercing of the hole and burring (see, FIGS. 15 to 18). However, the method in the third embodiment differs from that in the first embodiment in terms of the dies used in those procedures. Specifically, the dies used in each process are on a dedicated basis in order to highly accurately form the seating face 23. Next, a description will be given of differences of the manufacturing method in the third embodiment from that in the first embodiment.

[(2) Forming Raised Face]

In forming the raised face, a dedicated die 70, a press punch 72 and a pad 74 are used. The inner-circumferential surface 11 of the curved portion 10 of the shell 1 fixed with the dedicated die 70 and the pad 74 is pressed with the press punch 72, thereby forming the raised face 2 (see, FIG. 15).

The press punch 72 has a cylindrical shape, which is provided with a pressing surface 73 with a shape corresponding to the raised face 2 at one end.

The dedicated die 70 is placed outside the shell 1 and abuts against a periphery of an area on the outer-circumferential surface 12 of the curved portion 10 of the shell 1 at which the burring processed portion 13 is to be formed. At this point, a space is formed between this portion and a seating face forming portion 71 of the dedicated die 70. The seating face forming portion 71 is a depressed portion on the surface of the dedicated die 70 abutting against the outer-circumferential surface 12 and has a shape corresponding to the raised face 2.

The pad 74 is configured similarly to the inner side die 5 and comprises a layout space 75 that is similar to the one which the inner side die 5 comprises. The pad 74 is placed inside the shell 1 and abuts against a periphery of an area on the inner-circumferential surface 11 of the shell 1 at which the burring processed portion 13 is to be formed, and the layout space 75 is adjacent to this area. The press punch 72 is placed in the layout space 75.

Then the dedicated die 70 and the pad 74 hold the shell 1, thereby fixing the shell 1. The press punch 72, which is placed in the layout space 75, is displaced in the first direction D1 so as to press the inner-circumferential surface 11 of the curved portion 10 with the pressing surface 73 of the press punch 72 (see, FIG. 15). At this point, the curved portion 10 is caught between and pressed with the pressing surface 73 of the press punch 72 and the seating face forming portion 71 of the dedicated die 70, and thus the raised face 2 is formed.

Specifically, the press punch 72 is namely an inner die and, similarly to the inner die 3 in the first embodiment, is displaced in the first direction D1 so as to press the inner-circumferential surface 11 of the curved portion 10 of the shell 1 with the pressing surface 73. This is how the raised face 2 is formed. At this point, the dedicated die 70 functions as an outer die, and an area of the outer-circumferential surface 12 of the curved portion 10 opposing to the pressing surface 73 abuts against the seating face forming portion 71.

[(3) Piercing]

For piercing the hole, a piercing punch 80, a piercing die 82, a pad 85 and a dedicated die 88 are used. The raised face 2 of the curved portion 10 of the shell 1 is, similarly to in the first embodiment, pressed with the piercing punch 80 and, thereby, the second hole 27 is formed on the seating face 23 of the raised face 2 (see, FIGS. 16 and 17)

The piercing punch 80 is configured in a similar manner to the outer die 4 in the first embodiment and comprises a pressing surface 81 situated at an end thereof.

The piercing die 82 is configured in a similar manner to the inner die 3 in the first embodiment and comprises an outer rim pressing surface 83 and a hole 84.

The pad 85 is placed outside the shell 1 and abuts against a periphery of the raised face 2 on the outer-circumferential surface 12 of the curved portion 10 of the shell 1. The pad 85 comprises a through hole 86, which penetrates through the pad 85, and a peripheral rim 87, which surrounds the through hole 86. The peripheral rim 87 has a shape corresponding to the outermost rim 24 of the seating face 23 of the raised face 2. Upon placement of the pad 85, the through hole 86 is adjacent to an area of the raised face 2 of the seating face 23 at which the second hole 27 is to be formed, and the peripheral rim 87 abuts against the outermost rim 24 of the seating face 23.

The dedicated die 88 is configured similarly to the inner side die 5 and comprises a layout space 89 that is similar to the one which the inner side die 5 comprises. The dedicated die 88 is placed inside the shell 1 and abuts against the periphery of the raised face 2 on the inner-circumferential surface 11 of the shell 1, and the layout space 89 is adjacent to the raised face 2.

The piercing die 82 is placed in the layout space 89. At this point, the hole 84 of the piercing die 82 is adjacent to an area of the raised face 2 at which the second hole 27 is to be formed, and the outer rim pressing surface 83 abuts against the outermost rim 24.

Figure 17:
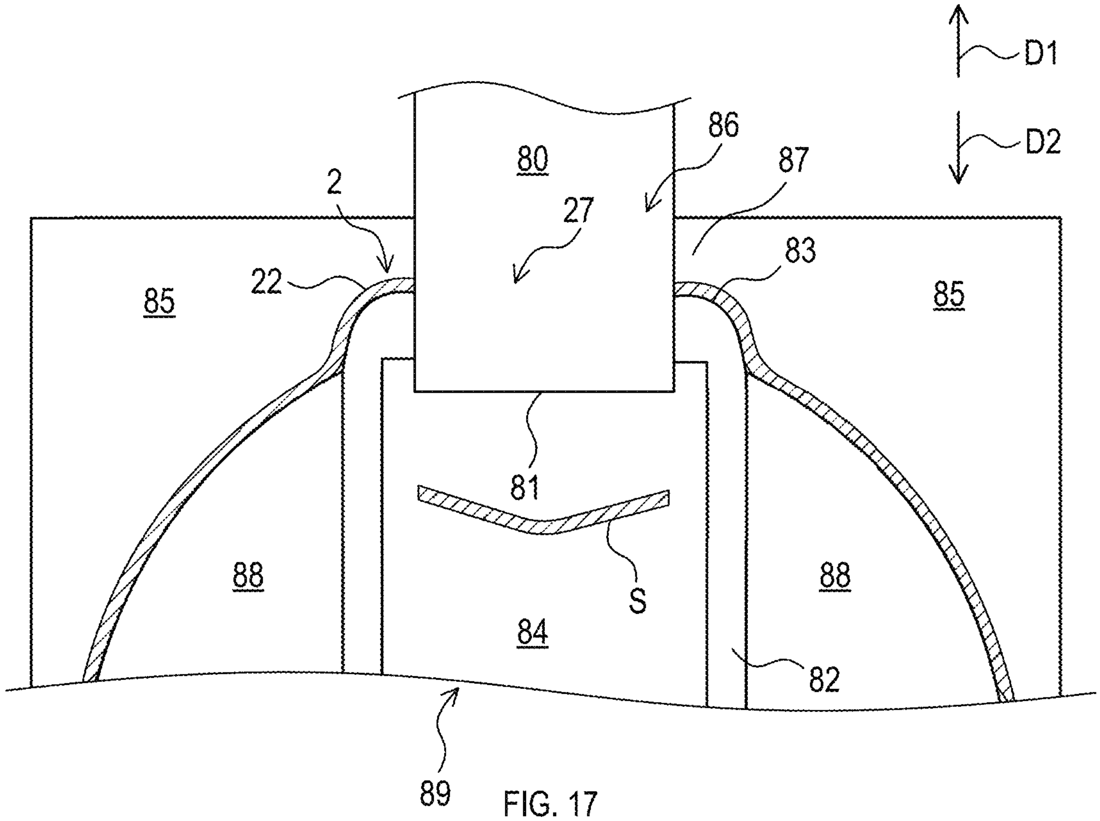
FIG. 17 is an explanatory diagram of the curved portion, the piercing punch, the piercing die, the pad, and the dedicated die in the third embodiment during the piercing of the hole, viewed in the direction of the axial line.
Figure 18:
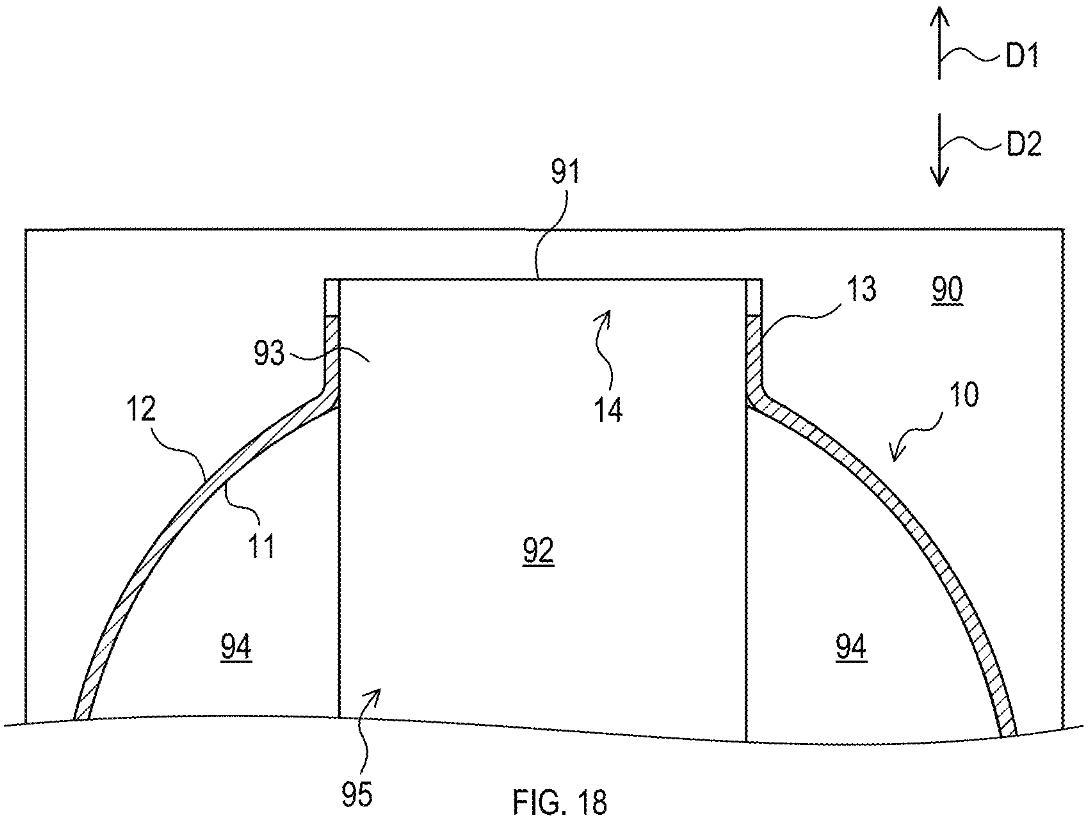
FIG. 18 is an explanatory diagram of the curved portion, a dedicated outer die, an inner side punch, and the pad in the third embodiment during burring, viewed in the direction of the axial line.

During piercing, similarly to in the first embodiment, the piercing punch 80 is displaced in the second direction, moves toward the pad 85 and passes through the through hole 86 (see, FIG. 17). After pressing the seating face 23 of the raised face 2, the pressing surface 81 of the piercing punch 80 penetrates through the seat 22 and enters into the hole 84 of the piercing die 82. As a result, the second hole 27 that penetrates through the seating face 23 is formed. At this point, the scrap S generated in the course of forming the second hole 27 falls into the hole 33 of the inner die 3.

[(4) Burring]

In burring, a dedicated outer die 90, an inner side punch 92, and a pad 94 are used. The raised face 2 of the curved portion 10 of the shell 1, on which the second hole 27 is formed, is pressed with the inner side punch 92, and thus the burring processed portion 13 is formed (see, FIG. 18).

The inner side punch 92 has a cylindrical shape and comprises a pressing end 93 with a flat end surface.

The dedicated outer die 90 is placed outside the shell 1 and abuts against the periphery of the raised face 2 on the outer-circumferential surface 12 of the curved portion 10 of the shell 1. The abutment surface of the dedicated outer die 90 against the outer-circumferential surface 12 is provided with a burring forming portion 91 shaped in a cylindrical hole. Upon placement of the dedicated outer die 90, the raised face 2 is contained in the burring forming portion 91.

The pad 94 is configured similarly to the inner side die 5 and comprises a layout space 95 that is similar to the one which the inner side die 5 comprises. The pad 94 is placed inside the shell 1 and abuts against the periphery of the raised face 2 on the inner-circumferential surface 11 of the shell 1, and the layout space 95 is adjacent to the raised face 2. The inner side punch 92 is placed in the layout space 95.

Then the dedicated outer die 90 and the pad 94 hold the shell 1, thereby fixing the shell 1. The inner side punch 92, which is placed in the layout space 95, is displaced in the first direction D1, and the inner side punch 92 is made penetrate through the second hole 27. At this point, the outermost rim 24 of the raised face 2 is caught between and pressed with an inner-circumferential surface of the burring forming portion 91 of the dedicated outer die 90 and an outer-circumferential surface of the inner side punch 92 on the peripheral of the pressing end 93, and thus the burring processed portion 13 is formed.

[4. Effects]

(1) According to the embodiment described above, owing to the two crests 25 on the seating face 23, it is possible to reduce occurrence of cracks in areas of the burring processed portion 13 on a peripheral of its ends in the circumferential direction D3 during the burring process, and thus the second hole 27 can be formed in a shape resembling a circle. This keeps an outer rim of the second hole 27 from having high curvature at some points, and occurrence of cracks during the burring process can further be reduced. Therefore, it is possible to favorably perform the burring process on the curved member.

(2) Forming the raised face is performed by pressing the curved portion 10 in the first direction D1, and the second hole 27 is formed by pressing the seating face 23 with the outer die 4 that is displaced in the second direction D2, which is opposite to the first direction D1. When the second hole 27 is formed using the outer die 4 that is displaced in the first direction D1, burrs are formed on the rim of the second hole 27 such that the burrs extend toward an outside of the curved portion 10. Such burrs can be stretched further outward during the burring process, making it more likely to occur cracks during the burring process. On the other hand, when the second hole 27 is formed using the outer die 4 that is displaced in the second direction D2, burrs are formed on the rim of the second hole 27 such that the burrs extend toward an inside of the curved portion 10. This kind of burrs are difficult to be stretched during the burring process, and as a result, occurrence of cracks during the burring process can be reduced. Furthermore, the outer die 4 that is displaced in the second direction D2 enters into the hole 33 of the inner die 3. Therefore, the scrap S generated in the course of forming the second hole 27 falls into the hole 33 of the inner die 3, making it easier to collect the scrap S.

(3) In the first embodiment, the slant in the seating face 23 provides a shearing angle effect, and noise generated when the second hole 27 is formed by being pressed with the outer die 4 can be reduced. Moreover, a bending moment decreases in the course of forming the second hole 27, and, therefore, work hardening can be suppressed from occurring in a periphery of the second hole 27, and occurrence of cracks thereon can be reduced.

(4) Furthermore, the second hole 27 can be formed on the seating face 23 by one press with the outer die 4. The piercing and burring are achieved by consecutive movements of the inner die 3 and the outer die 4. Owing to this, occurrence of cracks during the burring process can be reduced without increasing the number of steps.

5. Other Embodiments (1) In the first and second embodiments, the inner die 3, the outer die 4, the inner side die 5, and the outer side die 6 are used for forming the raised face, piercing the hole and burring, and the inner die 3 and the inner side die 5 are placed on the lower side while the outer die 4 and the outer side die 6 are placed on the upper side. However, the dies to be used in these procedures are not limited to the aforementioned ones and may be appropriately determined, as well as positions where each of the dies should be placed. Even in such a case, it is possible to favorably perform the burring process in a similar manner to in the first embodiment by forming the two crests 31 on the seating face 23 during forming of the raised face, or in a similar manner to in the second embodiment by forming the two crests 31 on the seating face 23 concurrently with forming the second hole 27.

(2) In the first and the second embodiment, the seating face 23 protrudes outward beyond the areas of the outer-circumferential surface 12 of the shell 1 on the peripheral of the raised face 2. However, the configuration of the seating face 23 is not limited to this, and, for example, the area including the center of the seating face 23 may be inwardly depressed compared to the peripheral areas.

(3) In piercing and burring in the second embodiment, the inner die 3 that is similar to the one used in the first embodiment is used, and the outer rim pressing surface 30 is provided with the two crests 31. However, the configuration of the outer rim pressing surface 30 is not limited to this, and the outer rim pressing surface 30 of the inner die 3 may extend in a substantially flat manner in a direction substantially orthogonal to the first and second directions D1, D2.

(4) A plurality of functions of a single component in the above embodiments may be achieved by a plurality of components, or a single function of a single component may be achieved by a plurality of components. Further, a plurality of functions of a plurality of components may be achieved by a single component, or a single function of a plurality of components may be achieved by a single component. It is also possible to omit a part of the configuration of the above-described embodiments. Further, at least part of the configuration of any of the above-described embodiments the component of any of the above embodiments ay be added or substituted to the other of the embodiments.

What is claimed is:

1. A method for manufacturing a burring processed member, the method comprising:

forming a side wall and a seating face by pressing an inner-circumferential surface of a curved portion in a first direction, the side wall protruding from a rim surrounding a first hole on the curved portion, the curved portion being a plate-like member whose cross section that is orthogonal to an axial line is curved, the seating face extending from a tip of the side wall; and forming a second hole and a burring processed portion, the second hole having a circular shape and penetrating through the seating face, the burring processed portion protruding in the first direction from the rim of the first hole and having a wall-like structure surrounding the first hole, wherein a direction that the cross section of the curved portion extends along is defined as a circumferential direction, wherein a peripheral area of an outer rim of the seating face is defined as an outermost rim, wherein the seating face comprises two crests that are situated at each end thereof in the circumferential direction, and wherein the seating face is slanted such that a seating face height becomes smaller from each of the crests to a substantial center in the circumferential direction, the seating face height being a length in the first direction between a reference plane and the seating face, the reference plane being a virtual plane that lies orthogonal to the first direction and lies closer to the inner-circumferential surface than the seating face.

2. The method for manufacturing the burring processed member according to claim 1, wherein the seating face is pressed in a second direction, the second direction being opposite to the first direction, thereby forming the second hole.

3. The method for manufacturing the burring processed member according to claim 2, wherein an inner die and an outer die are used in the method for manufacturing the burring processed member, wherein the inner die comprises a hole configured to allow the outer die to enter thereinto and an outer rim pressing surface that surrounds the hole, wherein the inner-circumferential surface of the curved portion is pressed in the first direction with the outer rim pressing surface of the inner die, thereby forming the seating face and the two crests on the seating face, and wherein, while an area of the inner-circumferential surface of the curved portion opposing to the seating face is supported by the outer rim pressing surface of the inner die, the seating face is pressed with the outer die, and the outer die is displaced toward the hole of the inner die, thereby forming the second hole.

4. The method for manufacturing the burring processed member according to claim 2, wherein an inner die and an outer die are used in the method for manufacturing the burring processed member, wherein the inner die comprises a hole configured to allow the outer die to enter thereinto and an outer rim pressing surface that surrounds the hole, wherein the inner-circumferential surface of the curved portion is pressed in the first direction with the outer rim pressing surface of the inner die, thereby forming the seating face, and wherein, while an area of the inner-circumferential surface of the curved portion opposing to the seating face is supported by the outer rim pressing surface of the inner die, the seating face is pressed with the outer die and thereby forming the two crests on the seating face, and the outer die is further displaced toward the hole of the inner die and thereby forming the second hole.

5. The method for manufacturing the burring processed member according to claim 1, wherein an inner die is used in the method for manufacturing the burring processed member, and wherein the inner die is displaced in the first direction so as to press the inner-circumferential surface of the curved portion, thereby forming the seating face and the two crests on the seating face.

6. The method for manufacturing the burring processed member according to claim 5, wherein an area of an outer-circumferential surface of the curved portion opposing to the inner die is opened when the inner-circumferential surface of the curved portion is pressed with the inner die.

7. The method for manufacturing the burring processed member according to claim 5, wherein an outer die is used in the method for manufacturing the burring processed member, and wherein, when the inner die presses the inner-circumferential surface of the curved portion, an area of an outer-circumferential surface of the curved portion opposing to the inner die abuts against the outer die.

8. The method for manufacturing the burring processed member according to claim 1, wherein an inner die and an outer die are used in the method for manufacturing the burring processed member, wherein the inner die is displaced in the first direction so as to press the inner-circumferential surface of the curved portion, thereby forming the seating face, and wherein the outer die is displaced in a second direction so as to press the seating face, the second direction being opposite to the first direction, thereby forming the two crests.

9. The method for manufacturing the burring processed member according to claim 1, wherein the burring processed member is configured to be installed in a vehicle.

10. The method for manufacturing the burring processed member according to claim 9, wherein the burring processed member is a part of a muffler.

* * * * *